Oct. 22, 1935.  W. D. FOSTER ET AL  2,017,855
PHOTOGRAPHIC APPARATUS

Original Filed April 28, 1926   5 Sheets-Sheet 1

INVENTORS.
WARREN DUNHAM FOSTER
and EARLE L. PARMELEE.
BY Wm. W. Lillard
ATTORNEY Oct. 22, 1935.  W. D. FOSTER ET AL  2,017,855
PHOTOGRAPHIC APPARATUS
Original Filed April 28, 1926   5 Sheets-Sheet 2

INVENTORS.
WARREN DUNHAM FOSTER
and EARLE L. PARMELEE.
BY Wm. W. Lillard
ATTORNEY Oct. 22, 1935. W. D. FOSTER ET AL 2,017,855
PHOTOGRAPHIC APPARATUS
Original Filed April 28, 1926  5 Sheets-Sheet 3

INVENTORS.
WARREN DUNHAM FOSTER and
EARLE L. PARMELEE.
BY Wm. W. Lillard
ATTORNEY.

Oct. 22, 1935.    W. D. FOSTER ET AL    2,017,855
PHOTOGRAPHIC APPARATUS
Original Filed April 28, 1926    5 Sheets-Sheet 4

INVENTORS.
WARREN DUNHAM FOSTER
and EARLE L. PARMELEE.
BY Wm. W. Lillard
ATTORNEY Oct. 22, 1935.    W. D. FOSTER ET AL    2,017,855
PHOTOGRAPHIC APPARATUS
Original Filed April 28, 1926    5 Sheets-Sheet 5

INVENTORS.
WARREN DUNHAM FOSTER and
EARLE L. PARMELEE.
ATTORNEY.

Patented Oct. 22, 1935

2,017,855

UNITED STATES PATENT OFFICE 2,017,855

PHOTOGRAPHIC APPARATUS

Warren Dunham Foster, Washington Township, Bergen County, N. J., and Earle L. Parmelee, Pittsburgh, Pa., assignors, by direct and mesne assignments, to Kinatome Patents Corporation New York, N. Y., a corporation of New York Original application April 28, 1926, Serial No. 105,159. Divided and this application January 18, 1932, Serial No. 587,392

40 Claims. (Cl. 88—17)

This application is a division of our co-pending application, Serial Number 105,159, filed April 28, 1926.

The present invention relates particularly to the art of photographic apparatus, the term "photographic" herein being used generically as definitive not only of apparatus frequently designated as "cameras" or by a similar name, but also of apparatus usually generically referred to as "motion picture projecting apparatus" as well as to stereopticon apparatus. The invention has special utility, however, with respect to the projection of pictures in motion, such as required for amusement either in the theatre or in the home, or for educational or advertising purposes. The utility of the invention is, however, not limited in this respect, it being equally well adapted for general use by either skilled or unskilled operators for the projection of pictures either in motion or as so-called "still" pictures, and for use with films bearing thereupon images representing sound, either alone or combined with pictures.

At the present time, considerable attention is being devoted to the construction of apparatus capable of being utilized for the repetitious display of motion pictures from a strip of film. By reason, however, of the fragile character of the film which must be used, and the difficulties of effecting reversal of its direction of travel, or rewinding of an exposed length, such apparatus has heretofore required not only a great deal of operating attention, but also frequent renewal of films or repair thereof. Our invention is particularly adapted for use in apparatus of the foregoing type and also for apparatus, for use in the home or otherwise, in which the motion picture is projected and then automatically rewound in readiness for the next showing, which may take place immediately or at some future time.

Efforts have also been made to effect continuous film travel in the same direction by securing the ends of the film together and providing some means for attempting adequately to take care of the main body of the film while the remaining comparatively short portion of the film has been passing through the gate. Considerable difficulty has, however, been experienced in this type of apparatus and its use has been necessarily limited.

In the copending application of Warren Dunham Foster, Serial No. 57,392, filed September 19, 1925, there is disclosed and claimed an improved form of apparatus of the general nature adaptable for example, in accordance with the present invention. In that application, the operation of the apparatus with relation to the direction of movement of the film, the speed of movement of the film, or the character of movement of the film is controlled automatically by the film itself, preferably through the agency of electrically operated devices having circuits energized or de-energized by the film itself during the travel thereof. Apparatus of such character has been found to be extremely desirable, due to the rapidity of control which may be obtained and the effectiveness of such control. In many cases, however, it may be desirable or necessary, due either to the particular construction of the apparatus being utilized, the construction or nature of the film or for other reasons, to provide means for controlling the film, as already set forth, without the necessity of providing it with special attachments, notches or specially constructed portions for the purpose of effecting any desired electrical operation directly.

In our parent application we describe and claim means for controlling by the character and intensity of light transmitted by the film itself, the movement of the film and actuation of all of the operable elements of the film handling apparatus associated with the movement of the film. In our co-pending application, Serial Number 587,393 filed concurrently herewith likewise a continuation in part of our said parent application, we describe and claim means for the exercise of such actuation and control by the tension of the film itself of all such operable elements excepting those directly connected with the gate. In the present divisional application, we describe method and means for the exercise of such actuation and control by the tension of the film itself of the operable elements associated with and including the gate.

A major object of the present invention is to provide method and mechanism whereby the gate and the parts associated therewith are automatically controlled by the tension of the film, such associated parts including the shoe, which presses the film against the feeding member, the means for stripping the film from the teeth of the feeding member and for rendering such teeth inaccessible by the film, and the operable guiding members associated with the gate. By the provision of such mechanism, the gate can be opened automatically at the desired time when all of the film has been projected, either for rewinding a film or inserting another film, and can be closed automatically after the film has been automatically re-threaded after rewinding. Also when a defective sprocket hole or a poor path, for example, arrests the feeding of the film, the gate is automatically opened and injury to the film is often prevented, it being understood that the film feed can be stopped simultaneously with the opening of the gate by mechanism described in our above noted copending application.

Another object of the present invention is to provide means automatically operable for opening the gate, which means are actuable by the tension of the film and are also operable at will regardless of the tension of the film. Such means can thus be advantageously employed for opening the gate for the film threading purposes.

A further object of our invention is to provide a mechanism which can be operated either electrically or manually for opening and closing the gate at will, and which can also be actuated by the film tension for opening the gate and thereafter be actuated by the film tension for closing the gate. Such construction permits the gate to be opened and closed by the operator before and after threading the film, and then provides for opening and closing of the gate automatically during repeated showings of the same film. It will be understood that our invention can also be advantageously applied to apparatus which automatically rewinds the film after one showing, and then stops automatically, allowing the operator to insert another film.

Still another object of the invention is to provide film controlled means for rendering the intermittent film feeding member usually associated with the gate structure inaccessible by the film, especially when the gate is opened for film threading purposes, for rewinding, or following improper feeding. By the provision of such means it is possible to provide a channel for the film through the gate which is clear of any projecting obstructions such as the sprocket teeth on which the film would otherwise catch and hang.

Another object of the invention is to provide means for bodily removing the film from the teeth of the feeding member preparatory to rewinding, rethreading, or when the tension of the film exceeds a predetermined point or when the film breaks, and to provide means for rendering the teeth of the feeding member inaccessible by the film during rewinding, threading, or following an emergency in film feeding. As shown, these two means are preferably combined in a single element, but this combination while highly desirable, is not essential.

Another object of the invention is to provide film control means for operating guiding members associated with the gate, one of such guiding members preferably being brought into a guiding relation to each end of the gate for film threading and film rewinding purposes.

Another object of the invention is to provide film controlled means operated concomitantly with the gate closing means for moving the film to a position wherein it may be operatively engaged by the rotatable intermittent feeding member associated with the gate. The provision of such means insures that after the closing of the gate the film can be fed in the usual way without further attention by the operator.

Further objects and advantageous features of the invention will appear as the description proceeds. It is understood that we are showing merely one preferred embodiment of our invention for purposes of illustration only.

In carrying out the present invention there may be provided an apparatus comprising a supporting base B having mounted thereon a lamp and resistance containing housing H and a supporting frame F upon which are mounted the operating parts of the film feeding and controlling mechanism per se.

Preferably carried by the frame F and projecting laterally from one side thereof in predetermined spaced relationship is a pair of reel receiving spindles 2 and 3, the upper spindle 2 being adapted for the holding of a reel of film during the feeding movement thereof and adapted to effect rewinding of the film at the conclusion of the feeding movement, while the lower spindle 3 is adapted to be positively driven simultaneously with the feeding movement for coiling or taking up the film as required. The ends of the film may be attached to the spindles in any suitable way.

The film itself is preferably carried in a combined storage and exhibiting protector comprising a pair of containers 4 and 5 having a pivotal connection 6 whereby the containers may be relatively separated to a predetermined extent to expose the desired length of film therebetween. This construction may be substantially as disclosed and claimed in the United States Patent No. 1,440,173, granted December 26, 1922, to Herbert George Ponting and George William Ford, or may be of any other desired construction.

The lower spindle 3, which will hereafter be referred to as the driving spindle, is journaled for rotation in a suitable bearing 7 in the frame F. The back of the frame is formed with an enlarged base 7a through which the spindle extends, and beyond the boss there is secured to the spindle a combined brake drum 8 and friction driving member 9. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14.

Projecting rearwardly from the disk 11 is a driving lug 15 adapted to be engaged by a clutch hereinafter described in detail by means of which the driving spindle 3 may be frictionally rotated.

Figures 4, 5:
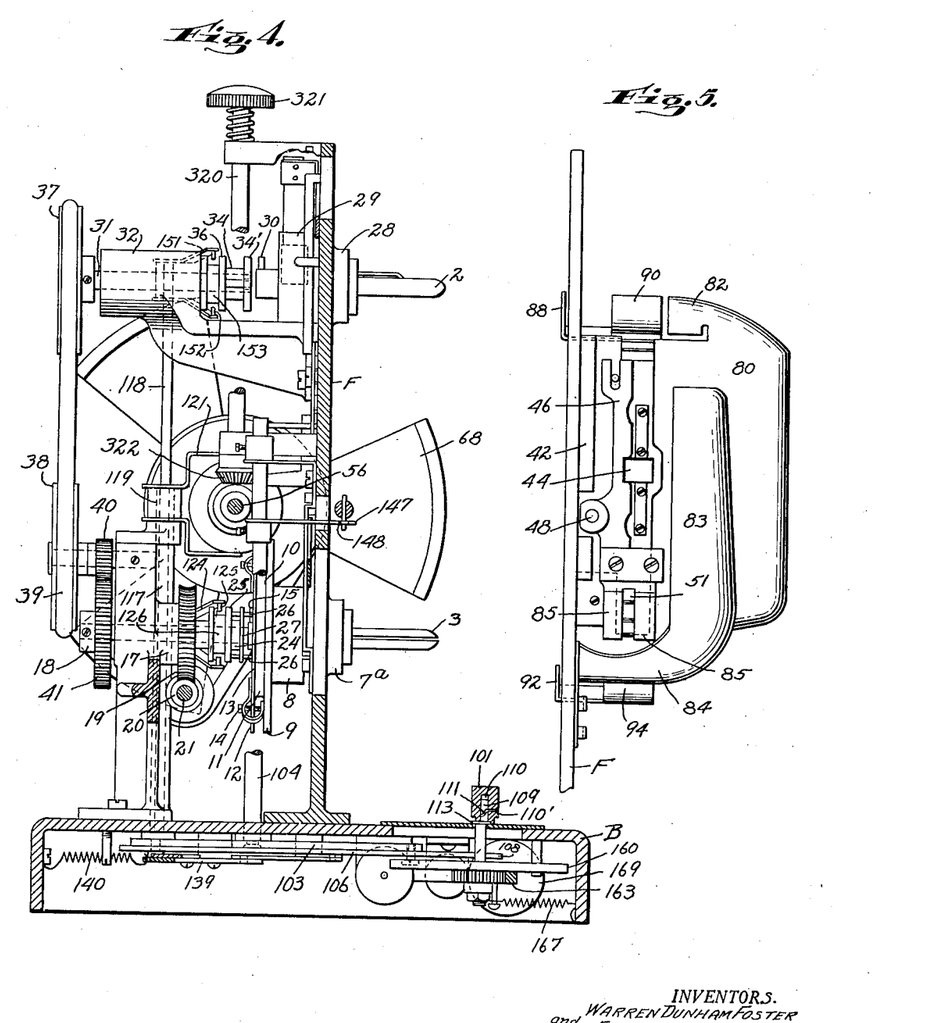
Figure 4 is a cross section along the line 4—4 of Figure 1 looking in the direction of the arrows.
Figure 5 is a partial cross sectional view looking forwardly away from the lamp house, showing the right side only to illustrate a portion of the gate.

Projecting upwardly from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located in the rear of the frame F. This shaft at its forward end is mounted in spaced bearings 22 carried by the bracket 16 and is connected to a driving motor M through a flexible coupling 23 of any desired or usual construction. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pins 26 slidable through the enlarged end 27 of the sleeve 24. By moving the collar 25 to the right as viewed in Figure 4, the pins 26 are projected into the path of travel of the driving lug 15 whereby a drive is positively transmitted to the driving spindle. This clutch will hereinafter be referred to as the driving spindle clutch. In case it is desired to render this clutch more quickly operative, other clutch devices of well known construction may be provided in place of the driving lug 15 and the pins 26.

The spindle 2, which will hereinafter be designated the rewinding spindle, is mounted similarly to the driving spindle 3 in a bearing 28 carried by the frame F, and has secured to its rear end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch similar in construction and operation to the construction of the driving spindle clutch. Upon movement of the collar 36 to the right as viewed in Figure 4, the pins 35 will be brought into the path of travel of the pin or lug 30 whereby the rewinding spindle 2 may be operated for effecting a rewinding of a previously displayed length of film.

For driving the shaft 31, it may conveniently have secured thereto a pulley 37 in line with a similar pulley 38 mounted on the outer end of a stub shaft 39 secured in the bracket 16. Also mounted on the shaft 39 is a spur gear 40 adapted to be driven by a similar, but preferably larger gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

Mounted on the frame F adjacent the motor M and preferably on the front side of the frame is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section, and intersecting the opening 44, for the travel of the film. Cooperating with the section 42 is a relatively movable section 46 preferably guided by a pin 47 projecting outwardly from the section 42, and secured to one end of a gate opening rod 48 slidable through a suitable opening in the gate section 42 and a suitable bearing 49 on the frame F. By reason of this construction, it will be apparent that when the rod 48 is moved to the left as viewed in Figure 1, it will be effective for moving the section 46 away from the section 42 to permit the removal of a film and the insertion of a new film, while movement in the opposite direction will bring the sections into cooperative relationship. As will be observed by an inspection of Figure 2 a conventional spring pressed presser member 45' is provided.

For effecting the desired intermittent feeding motion of a film in position in the gate, there may be provided a rotatable feeding sprocket 50 having film engaging teeth 51 positioned to engage apertures positioned in the film f, in any desired manner. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end in a grease casing C within which are mounted the cam 55 and star wheel 54, and at its opposite end journaled in a suitable bearing 57 carried by a bracket 58 projecting rearwardly from the frame F.

Mounted loosely on the shaft 56 adjacent the opposite end thereof is a pulley 59 having a frictionally faced member 60 adapted to be rendered operative at will by a clutch collar 62 having a frictionally faced member 61 engaging said member 60. The clutch collar is normally urged in such direction as to be in frictional driving engagement with the pulley 59 by means of a spring 63 abutting at one end against the bottom of a spring receiving recess formed in the collar and at the other end against a shoulder 64 on a spring sleeve 66 secured in any desired manner to the shaft 56 for rotation therewith. Secured to the shaft 56 outside of the pulley 59 is a hub 67 carrying a shutter 68 for operation as well understood in the art. The hub 67 and the shoulder 64 take all of the thrust exerted by the spring 63 whereby the shaft 56 as a whole is relieved from any end thrust.

Secured to the end of the driving shaft 21, and preferably substantially in line with the pulley 59 is a pulley 69 around which may pass a belt 70 for driving the pulley 59 from the drive shaft. By reason of this construction, it will be apparent that with the friction surfaces 60 and 61 in engagement rotation will be imparted to the shutter shaft 56 from the driving shaft 21, this rotation being effective not only for operating the shutter but also for obtaining the desired intermittent operation of the film feeding sprocket.

Figure 1:
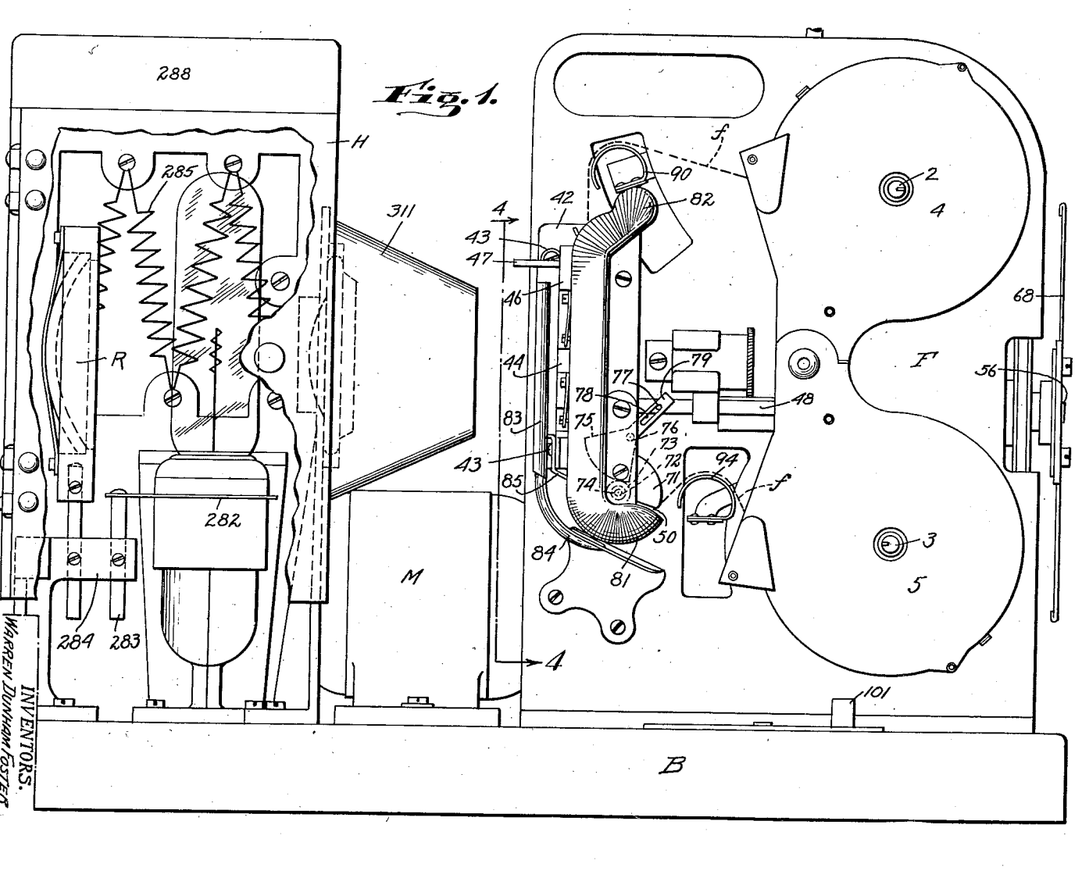
Figure 1 is a right side elevation of the machine, certain parts being broken away.

Cooperating with the sprocket 50 and normally occupying the position illustrated in Figure 1 of the drawings, is a stripping and protecting shield 71 carried by the inner end of a pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counterclockwise direction as viewed in this figure, thereby rotating the shield in a clockwise direction. This rotational movement of the shield will be effective for engaging the film f and stripping the same from the sprocket preparatory to the removal of the film from the apparatus. It will remain in this position covering certain of the teeth of the sprocket during the application of a new film or during rewinding, whereby the threading operation of the film is greatly expedited or the film protected during rewinding and during removal from the apparatus.

For further assisting the threading movement, the relatively fixed gate section 42 is provided with a projecting guide 80 having a generally curved contour for gradually feeding the film over the fixed gate section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85 curved to generally conform to the curvature of the sprocket 50, the space between these fingers being sufficient to acommodate the teeth 51 of the sprocket.

These guides cooperate in a manner, as will be readily apparent from the drawings, to permit a film to be positioned between the gate members by merely moving the same laterally relative to its normal direction of travel through the gate. This greatly lessens the time required for threading a new film into position, and enables the operation to be performed satisfactorily by an unskilled operator.

It will be readily understood by those skilled in the art that our invention may be employed with any type of conventional film handling apparatus, including particularly that in which compensation for the difference between the character of movement of the mass of film upon the delivery and take-up spindles and that of the section thereof at the aperture is provided by the usual unsupported loops of slack film. We prefer, however, to make use of the tension control system of feeding which is described and claimed in the copending application of Charles Ulysses Bundick and Barton Allen Proctor, Serial No. 44,482, filed July 18, 1925, which application is owned by the same assignee as is the present application. By so doing we entirely obviate the necessity of manually producing slack or loops as heretofore provided and at the same time employ the mechanism by which such result is accomplished for carrying out a very important part of the control operation. It will be readily understood, however, that this joint use of a portion of the mechanism of the Bundick and Proctor system of film feeding for its feeding and compensating purpose and likewise for completing the necessary control circuit, as is later described in detail, is merely a matter of convenience and, if desired, separate elements may be used.

The tension control system of feeding preferably includes film tensioning and auxiliary feeding means automatically operated by the film. It may include a braking surface 86, attached to the tension arm 88 by means of the member 86', preferably resilient, and adapted to cooperate with the braking drum 29 revoluble with the spindle 2. The tension arm 88 is pivoted upon a pin 89 and terminates to the right as viewed in Figure 3 in a film engaging member or film guide 90, which extends through the opening 91 in the main frame F and into the track of the film. Similarly the braking shoe 87, which is adapted for cooperation with the braking surface 8 revoluble with the take-up spindle 2 is attached by means of the member 87', preferably resilient, to the curved lever 92 secured to a plate 93 loosely surrounding the boss 7a on the frame F whereby the plate as a unit may be rotated about the boss, such lever terminating in the film engaging member or film guide 94 which extends through the opening 95 in the frame F and into the film track. During the feeding of a film through the apparatus all of the parts occupy the position illustrated in Figure 1 while during the threading of a film into position or the removal of a film from the apparatus, the parts occupy the position illustrated in Figure 2. In this latter position it will be noted that the guide 94 occupies such a position with respect to the curved end 84 of the guide member 83 as to insure the passage of a film around the guide 94 automatically upon lateral movement of the film, while the guide 90 occupies such a position with respect to the inclined curved upper end 82 of the guide member 80 as to insure passage of a film over and around the guide 90 by the operation referred to.

As power is applied to the sprocket 50, the sprocket revolves and the film is pulled from the spindle 2, the arm 88 is depressed and energy is stored in the spring 96. While the sprocket 50 is at rest, the spring 96 acts on the arm 88 to cause an amount of the film to be pulled from the spindle 2. The magnitude of the flat spring 90 may be so determined that it will assist in the above described auxiliary feeding operation. Upon the next rotation of the sprocket 50, the film is again fed forwardly, the portion necessary to compensate for the displacement caused thereby being the length of film previously pulled from the spindle 2 and such as at that moment is pulled from the spindle 2. This movement of the film f again moves the arm 88 to store power in the spring 96 which is used during the next period of rest of the sprocket 50 to pull more film from the sprocket 2, and the foregoing cycle is repeated throughout the entire period of operation.

In addition to the operation above described, the lever 88 and its associated parts perform a braking function. The lever 88 is normally swung in such direction as to bring the brake 86 into contact with the drum 29 by means of the spring 96. Due to the action of this spring, the brake 86 tends to prevent too free rotation of the rewinding shaft and thereby prevents the tension on the film becoming less than that required for proper feeding. In the event, however, of a tendency toward too great tension, the tension on the film causes the lever 88 to move in opposition to the action of the spring 96, thereby relieving the braking action of the brake 86 to a corresponding extent and reestablishing the predetermined tension on the film.

The operation of the arm 92, the film pad 94, the take-up spindle 3 and the sprocket 50 is analagous to that of the elements between the sprocket 50 and the supply spindle 2 above described. As the sprocket 50 revolves, a portion of the film is moved forward. The resilient end of the spring arm 87' aided if desired by the pad 94, holds the film constantly under tension. The spindle 3, yieldingly but continuously driven, pulls the film onward and coils it up. This operation tends to move the arm 92 against the pressure of the spring 87'. Thus, there is stored an amount of energy which is sufficient to move the film away from the sprocket and to maintain the tension upon the film f during the next period of rest of the sprocket 50, a direct pull upon the perforations of the film seated upon the teeth 51 of the sprocket is prevented by the cushioning effect of the spring 87' offsetting the frictional drive of the spindle 3.

In addition to the auxiliary feeding operation above described, the arm 87' with its associated parts performs a braking function.

The lower brake 87, is normally so positioned as to exert little braking action on the drum 8. In the event, however of a tendency toward undue tension on the film between the feeding sprocket 50 and the reel carried by the driving spindle 3, the film will be effective to swing the lever 92 in such direction about its pivotal mounting 92' on the plate 93 as to bring the brake 87 into more effective braking engagement with the drum 8. Due to the fact that the spindle 3 is driven from the motor through a friction drive, such braking action will be effective for decreasing the driving force on the spindle 3, and consequently will relieve the tension on the film and produce the desired operating conditions between the sprocket and the lower reel.

The braking operation above described is of great usefulness where abnormal conditions of feeding arise, such for example as the binding of a shaft from any cause, or lack of lubrication, or the intrusion of a piece of grit, or a poor patch getting caught in the gate, or sudden acceleration or deceleration of the intermittent sprocket 50 owing to a sudden change in the voltage applied to the motor M or other temporary aberration characteristic of feeding. Applicants have been able successfully to feed film without the use of the braking means in addition to the primary tension controlling means but they prefer to use both means.

In the manner described required tension on the film to insure proper feeding is automatically secured by the mere threading of the film into position, and is automatically maintained by the operation of the tension or braking mechanism.

While the present apparatus is not necessarily limited to any particular field of use, it is primarily intended either for use in advertising for the successive showing of a length of film or use by persons who may be unskilled in threading the film through the gate. With this dual purpose in view, it is desirable not only to provide for automatic control, but also to simplify the control of the gate to as great an extent as possible not only for the purpose of rendering the operation easier, but for the purpose of making such operation foolproof. For this purpose there is preferably provided a single control member in the form of a knob or button 101 projecting upwardly through an arcuate slot 102 in the supporting base B. This slot may be so shaped as to provide four operating stations designated, respectively, S1, S2, S3 and S4. The button 101 is adapted to be moved at will either manually so as to occupy any one of these stations, or automatically so as to occupy any of stations S1, S2 and S4. With this button at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding. This provision of a single control member movable only in a predetermined manner and automatically effective upon movement for producing all of the necessary changes in operating conditions constitutes an important feature of the present invention, as it renders the control and operation of the apparatus extremely simple and substantially foolproof.

The control mechanism actuated either manually by the control knob or automatically as hereinafter set forth in detail, is to a large extent shown in Figures 6 and 7 and diagrammatically in Figure 8, which illustrate the change in the position of the parts of the control mechanism by movement of the control button to the stations S2 and S3, and the circuits by means of which the desired movements are produced. This mechanism may comprise a lever 103 keyed or otherwise secured to the lower end of a brake release rod 104 having its lower end journaled in any desired manner in the base B and its upper end journaled in a bearing bracket 105. Being secured to the brake release rod 104 which is capable only of a turning movement about its longitudinal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At its front end the lever 106 carries an upstanding pin 109 having a head 110 provided with an inwardly projecting pin 110' adapted to engage a bayonet shaped slot 111 in the pin 109. By reason of this construction it will be apparent that the button may be moved vertically on the pin 109 by a rotative movement thereof so that it may either occupy an upper or a lower position on the pin. At its lower end the button has a collar 113 of a diameter to substantially conform to the contour of the slot 102 at the respective operating stations, whereby with the button in its lower position accidental movement from one of these stations is prevented, while with the button in its upper position the parts are free for automatic operation independently of any operator.

At a point intermediate its ends the combined rotating and sliding lever 106 is provided with a transversely extending recess 114 adapted to cooperate with a pin 115 projecting from a lever 116 which is secured adjacent one end on a control sleeve 117 surrounding a control rod 118, the sleeve and rod extending upwardly through the base B and journaled for rotational movement in bearings 119 carried by the bracket 16 and by an upper bearing 120 carried by a bracket 33. Adjacent its upper end the control sleeve 117 has projecting therefrom forked operating arms 121 carrying projecting pins 122 adapted to normally lie in the groove 123 of the clutch member 62 on the shutter shaft 56. By reason of this construction it will be apparent that upon rotation of the sleeve 117 in a counter-clockwise direction, as viewed in Figure 6, the clutch members 60 and 61 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch to thereby permit the driving spindle to move freely in either direction. Engagement of the driving spindle clutch and the shutter shaft clutch will be effective for the so-called projection of pictures in motion but this engagement is not required for still or stereopticon results. This operation of the sleeve 117 is obtained by moving the control button from station S1 to station S2, by reason of the relative movement imparted to the sleeve due to the sliding action of the lever 106.

Pivotally mounted adjacent the side of the combined sliding and swinging lever structure is a friction and positive detent 127. One end of this detent has connected thereto one end of a tension spring 128, the opposite end of which is secured to a suitable projection on the base B of the apparatus. The spring normally tends to swing the detent in a counterclockwise direction about its pivotal mounting as will be apparent from the drawings. This forces the upper end of the detent into frictional engagement with the sides of the levers 103 and 106, thereby tending to frictionally hold the same in any position to which they may be moved.

It may be assumed that after the single projection of a film, or the repeated projection thereof, it is desired to change the same, or that in starting it may be necessary to move the parts of the apparatus into such position that a film may be threaded into position therein. Under such circumstances, the control button will be moved from station S2 to station S3. This movement will be effective only for rotating the brake release rod 104 and for bringing a recess 137 in the lever 106 into cooperative engagement with a pin 138, projecting upwardly from a lever 139, secured to the lower end of the control rod 118.

Figure 6:
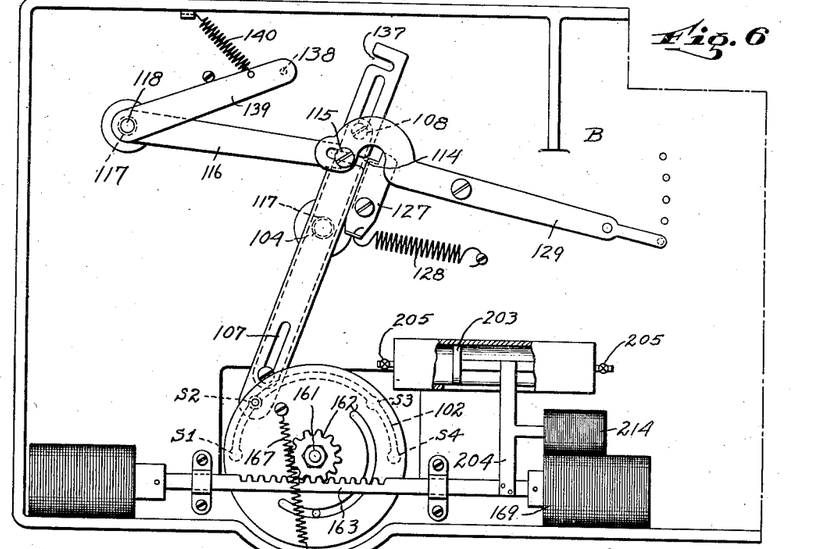
Figure 6 is a partial bottom plan view showing actuating levers in "still projection" position.
Figure 7:
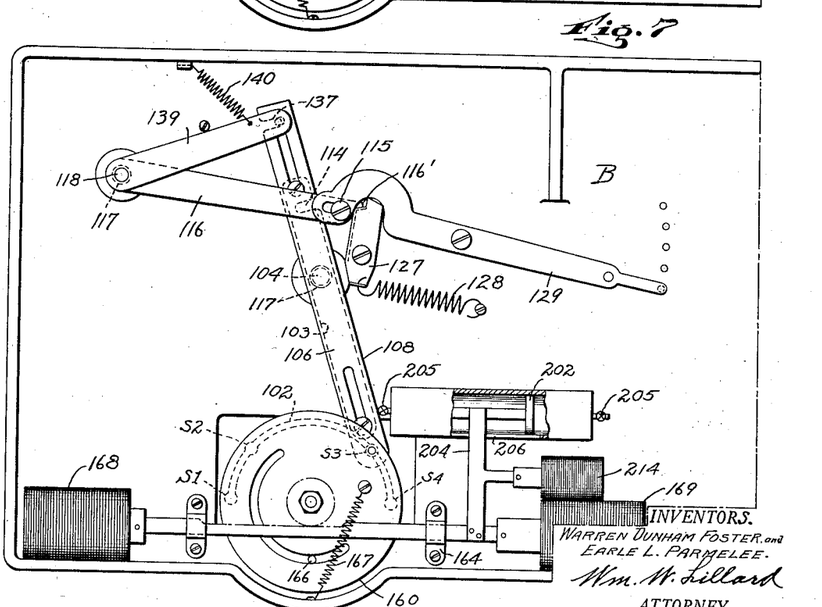
Figure 7 is a partial bottom plan view showing actuating levers in a "film threading or changing" position.

The lever 139 is normally held in the position shown in Figures 6 and 7 by a tension spring 140, which may be secured in any desired manner to the base B of the apparatus. In this position, the pin 138 will be received by the slot 137 when the parts are rotated in the manner described.

At the commencement of the movement from the station S2 to station S3, the combined swinging and sliding lever structure will be moved away from the detent 127, thereby permitting it to swing in a counterclockwise direction under the influence of its tension spring. This movement will be effective for bringing the notched end of the detent into engagement with the projection 116' of the end of the lever 116, whereby the lever 116 and its associated parts will be held in the proper position.

The rotation of the brake release rod is effective for opening the gate sections of the gate, for moving the tension arms 86 and 87 and their associated parts to inoperative position and for so actuating the stripper shield 71 as to effect the desired stripping movement of a film from the sprocket 50 or the shielding of the sprocket to permit the threading of a new film into position. It will be understood that this movement of the tension arms 86 and 87 from projecting to threading position brings the film contacting members 90 and 94 into guiding relation with the gate and with the fixed guiding members carried thereby thus cooperating to define a portion of the path in which the film is initially threaded. These operations are obtained by securing to the upper end of the brake release rod a pin 141 extending into a slot 142 in one arm of a bell-crank lever 143, having a pivotal mounting 144 on the back of the frame F. The opposite arm of the bell-crank lever is in cooperative engagement with one end of a link 145 movable through a slide or guide 146 and having its upper end bent inwardly to extend over the tension arm lever 88. Movement of the control button from the station S2 to the station S3 will be effective for rotating the brake release rod 104 in a clockwise direction, as viewed in Figure 7, thereby rotating the bell-crank lever 143 in a counterclockwise direction, as viewed in Figure 3, and consequently, rotating the tension arm lever 88 about its pivotal mounting 89 in opposition to the spring 96 for moving the tension arm 86 to inoperative position.

Figure 2:
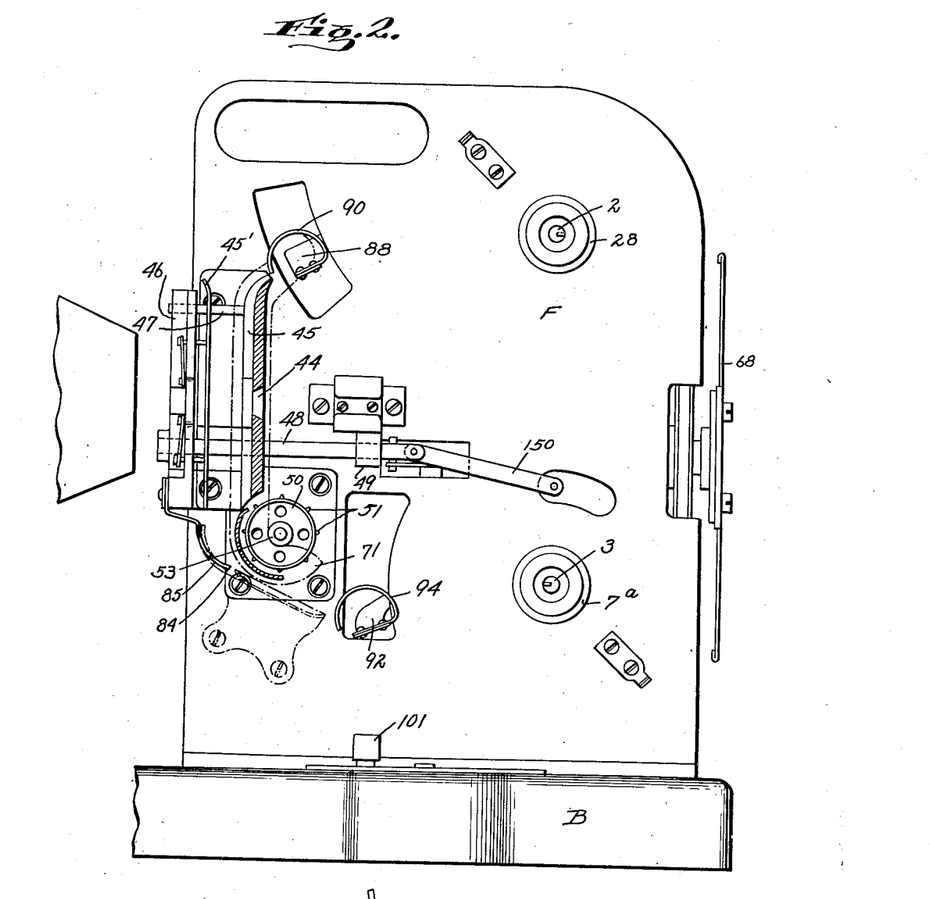
Figure 2 is a partial right side elevation broken away to more clearly show portions of the gate in film threading position.
Figure 3:
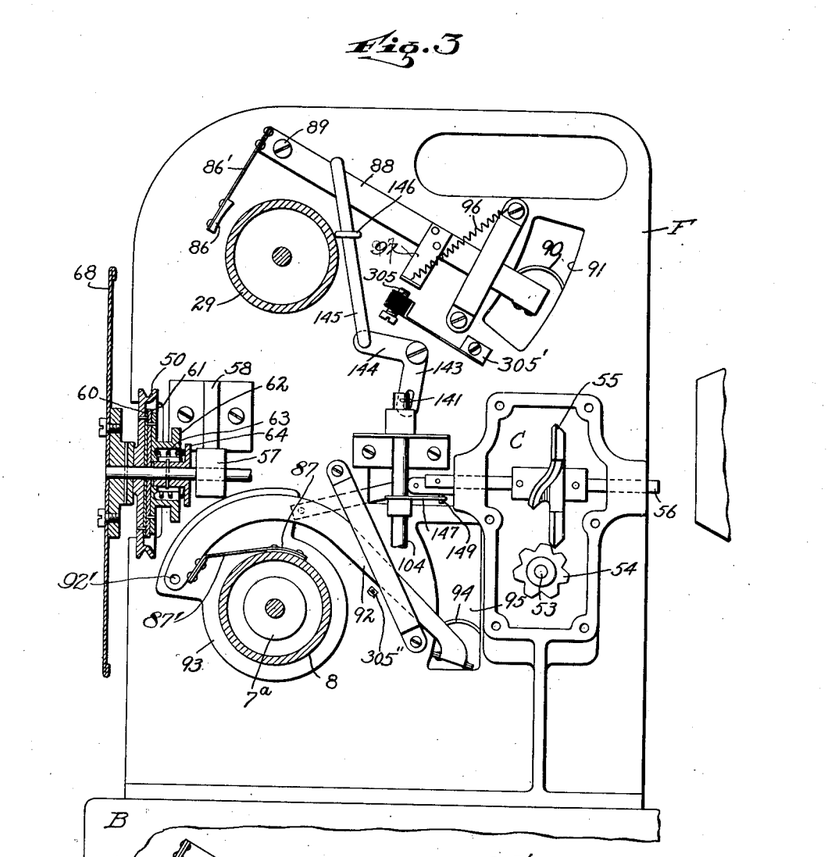
Figure 3 is a partial left side elevation broken away to better illustrate certain film feeding parts which cooperate with the film to actuate the gate control mechanism.

Movement of the lower tension arm is obtained simultaneously with actuation of the upper tension arm through the medium of a crank lever 147, secured at an intermediate point to the brake release rod. This crank lever has a slot 148 in its free end into which projects a downwardly extending pin 149 carried by the gate control rod 48. The right hand end of the gate control rod as viewed in Figure 2, is connected by a link 150 with the tension arm lever 92, whereby said tension arm lever and the gate control rod operate in unison. Movement of the brake release rod occasioned by operation of the control button from station S2 to station S3 is effective for rotating the parts 93 and all parts carried thereby in such direction as to lower the film guide 94 in the slot 95 and bring it into such cooperative relation to the guides 80 and 83 as shown in Figure 2, as to facilitate the removal of a film or the positioning of another film. This movement of the gate control rod will also tend to separate the gate sections and will move the shield 71 into stripping and shielding position, as will be obvious.

Claims drawn to the cooperation of the film guides 91 and 94 with the gate for guiding purposes are included in this application. Claims drawn to the control of the tension arms as such will be found in our other co-pending application filed concurrently herewith.

If it is not desired to change a film, as would be the case in advertising for example, or in apparatus in which a film is automatically rewound once only preparatory to the manual insertion of another film, the control button may be moved from station S3 to station S4, or may be moved from station S2 to station S4 without stopping at station S3. This movement will be effective by reason of the engagement between the recess 137 and the pin 138 for rotating the control rod 118. At its upper end, this control rod carries spaced arms 151, similar to the arms 121 and 124 previously described, and provided with pins 152, normally lying in the groove 153, in the rewinding clutch collar 36. The rotation of the control rod 118, as occasioned by the movement of the control button from station S3 to station S4 will be such as to move the rewinding clutch into operative position, whereby the spindle 2 is connected in driving engagement with the shaft 31, this engagement being such that the film may be rewound by the continued operation of the motor M.

During this time, the spring 140 will be held under tension in such manner that should an operator fail to completely position the button at the station S4, the spring will be effective for automatically restoring the parts to an inoperative position at station S3.

From the foregoing, it will be apparent that the operation of a single control button performs in succession the necessary changes in the operating positions of the various parts for permitting any desired condition of operation of the apparatus. Upon movement of the control button from station S4 to station S3, the rewinding clutch will be disengaged and the lever 139 held in position by the detent 140. Upon movement from the station S3 to station S2, the recess 137 will leave the pin 138 and the brake release rod 104 will be rotated in the opposite direction to that heretofore described.

During this movement, the combined swinging and lever structure will come into engagement with the detent 127 and swing it in a clockwise direction against the action of its controlling spring, to thereby release the projection 116' from the holding action of the detent, and permit the lever 116 and its associated parts to be subsequently moved as required, upon movement of the control button from station S2 to station S1. Such movement of the button will swing the lever 116 in the opposite direction to that previously described, and thereby effect re-engagement of the shutter clutch and of the driving spindle clutch.

Reference has heretofore been made to the adaptability of the apparatus to advertising or other purposes wherein repetitious showing of the film is desirable, and wherein for practical reasons, it is not feasible to have an operator in constant attendance. In such cases, the movement of the control parts may be automatically obtained merely by moving the control button 101 to its upper position on the pin 109 as before described. When in this position, there will be no holding or locking effected by the button so that all of the parts are free for automatic operation. Mechanism for this purpose is shown in Figures 6, 7 and 8.

As shown in Figures 6 and 7, one form of mechanism may comprise a disk 160 having a pivotal or rotative support 161 on the base B. This disk has secured thereto the pin 109, whereby rotation of the disk will accomplish the same movement of the control mechanism as is effected by movement of the button 101. Such rotation may be obtained by providing a pinion 162, concentric with the support 161. Cooperating with this pinion is a rack 163, preferably of rectangular or angular cross section, whereby it may be effectively held in the desired operating position by means of guides 164 on the base B. Formed in the disk 160 is an arcuate slot 165 into which extends a stop pin 166, projecting downwardly from the base of the apparatus. The length of the slot is such that it will just permit enough rotation of the disk to move the pin 109 from station S1 to station S4 or vice versa, the stop pin positively stopping the disk in desired position at these stations. Accidental movement away from these stations may be prevented by the provision of a comparatively strong tension spring 167, having one end secured to the disk and the opposite end attached to the base B, the point of attachment to the disk being such that after the disk passes a midpoint between stations S1 and S4, the spring will be effective for assisting in completing such movement, the spring being placed under gradually increasing tension until such midpoint is reached.

It will be obvious to those skilled in this art that at this time, the spring 167 will effectively overcome the action of the spring 140, whereby after the button has been moved a distance far enough to effect the desired operation of the apparatus, the spring 167 will prevent return of the parts to neutral position at station S3.

For producing movement of the rack bar 163, it may be constructed either throughout, or may have end portions, of magnetic material adapted to act as cores for the solenoids 168 and 169. As viewed in Figures 6 and 7, it will be obvious that energization of the solenoid 168 will be effective for rotating the disk 160 in a clockwise direction, while energization of the solenoid 169 will effect rotation of the disk in the opposite direction. Thus, the solenoid 168 will be effective for moving the control mechanism from station S1 to station S4 to establish rewinding conditions, while the solenoid 169 will be operative at the conclusion of rewinding to re-establish projecting conditions.

The apparatus of the present invention may be advantageously used to show both motion pictures and still pictures, as for example by a lecturer in connection with his talk. Still pictures may be projected by moving the control mechanism to station S2 manually or by the means and method shown in the parent case or by the electrical means of the present case controlled as by the lecturer at a distance from the apparatus. Such electrical means may include the core 213 of the solenoid 214, which core is connected to the upright arm 204 fastened rigidly to the rack 163, as illustrated in Figure 7. The solenoid 214 when energized, will be effective for moving the disk 160 in a clockwise direction. The dimensioning of the core 213 with respect to the center of the magnetic field of the solenoid 214 is such that the solenoid will only be effective for moving the disk 160 a distance sufficient to bring the pin 109 to station S2, which is the station for still projection. The circuit of the solenoid 214 may include conducting elements hereinafter described which may lead from the apparatus to a usual table placed near the above mentioned lecturer. A conventional switch in the circuit will be normally open and upon closing it the speaker can energize the solenoid 214 and project still pictures whenever he desires. Upon releasing the switch and deenergizing the solenoid 214, the spring 167 will be effective to return the control mechanism to station S1, which is the station for projecting motion pictures.

It may be desired predeterminedly to time the gate closing and gate opening operations and the operations associated therewith. This may be accomplished by the provision of a suitable timing device herein shown for purposes of illustration only as comprising a dash pot 201 with which cooperate pistons 202 and 203 carried by a projection 204 on the rack 163. The dash pot, which may be of double construction, has a controllable one way acting release 205 for each end thereof whereby the speed of travel of the piston in either direction may be controlled, the length of slot 206 through which the projection 204 extends determining the time at which the dash pot first becomes effective in either direction. This variable timing is of importance, as it provides flexibility for different operating conditions, or films of different characteristics. It will be apparent to those skilled in the art that the dash pot may be of special construction having a variable speed of movement at different times, whereby it may have a gradually accelerating speed in either direction after a period of relatively slow movement.

The energization of the respective solenoids at predetermined time intervals may obviously be accomplished automatically in a number of different ways. Certain of such ways are described and claimed in the above-mentioned parent application, Serial Number 105,159, filed April 28, 1926, notably the use of light passed through the film, as it is moved through the apparatus, and impinging upon a photo-electric or other suitable cell and thereby producing electrical variations which are used to actuate all of the operable elements of the apparatus in the desired relations. The present application claims the use of the tension of the film, as it is moved through the apparatus, for controlling the mechanisms which actuate the gate and other operable elements. It will be readily understood by those skilled in the art that the tension controlled actuating mechanisms claimed in this application may be advantageously combined with the light-controlled actuating mechanisms described and claimed in the parent application. For example, the feeding operation might be stopped and restarted, for the purpose of showing successive still pictures, by the light controlled means of the parent case and reversal with the gate control may be accomplished by the tension-controlled means claimed herein. For further example, reversal after the feeding operation might be accomplished by the means claimed herein and reversal after the rewinding operation by the means shown in the parent case, or vice versa.

It will readily be understood by those skilled in the art that the control of the operable elements of the film handling apparatus by means of electrical circuits which are actuated by the tension of the film makes it possible so to construct the apparatus that much less strain is placed upon the film than would be the case if the control mechanism were to be operated directly by the tension of the film instead of through the agency of electrical circuits which can be made and broken by a very slight change in film tension. For certain types of apparatus, however, it is satisfactory to control the operation of the machine directly by mechanical connections operated by film tension and such control is within the scope of our invention.

Figure 8:
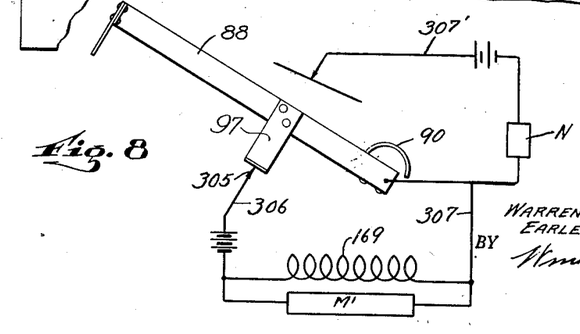
Figure 8 is a view largely diagrammatic which illustrates a portion of the electric circuit of the gate control mechanism.

In Figure 8 there is illustrated means by which the tension of the film may be utilized for actuating the control mechanism for actuating the various operable elements of the gate and other cooperating parts of the apparatus. The upper tension arm 88 when drawn to its lowermost position by the tension of the film, engages the contact 305 as viewed in Figure 8, which contact may be yieldingly mounted on a spring member (not shown), and be connected by a wire 306 to one side of a suitable source of electric current, the opposite side of which source is connected to one terminal of the solenoid 169. The opposite side of the solenoid is connected by a wire 307 to a suitable point on a tension arm 88. For the sake of clarity in the drawings, this point is indicated in Figure 8 as being positioned on the right end of the arm 88, but it will be understood by those skilled in electrical circuits that the wire 307 may be joined to the arm 88 nearer its pivot, and a suitable insulated conductor member may extend between the end of the wire 307 and the contact 305. Or a conventional switch of any suitable kind, operated by the movement of the arm 88, may be employed. Likewise, the arm 88 instead of closing the circuit to the solenoid might close a circuit to other means as indicated diagrammatically at M'. By similar structure to that described above in this paragraph, the solenoid 169 may be connected in a similar electric circuit and be made effective by film tension for actuating the mechanism which opens the gate, moves the shoe away from the sprocket, moves the stripping shield to protective position while removing the film from the teeth of the sprocket, and thereafter actuates the rewinding means.

In Figure 8 the parts are shown as when the rewinding of the film has just been completed, and hence the gate is open and the feeding of the film for projection purposes is about to be started and it is desirable to close the gate. The solenoid 169 being then energized, will move the control mechanism to the S—1 position and normal feeding of the film for projection purposes will result.

It can be readily seen that the above described mechanism will function regardless of whether the film is fed over the guide member 90 under tension or not. Should the film not be fed under tension, as when a loop is used, the member 97 will be normally disposed a little farther away from the contact 305, but when the tension in the film is sufficient the member 97 will be moved against the contact in exactly the same way as described above. It will be understood that the member 97 on the arm 88, while the film is moving normally in either direction, will always be held away from the contact 305 by the spring 96.

Figure 9:
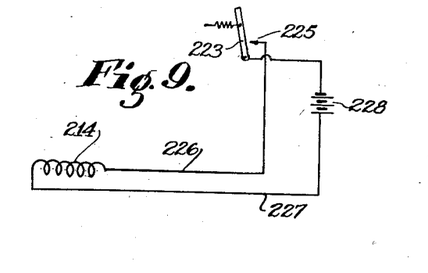
Figure 9 is a diagrammatic view illustrating how the solenoid 214 may be controlled independently of the solenoids 168 and 169.

In Figure 9 there is disclosed the solenoid 214 with a circuit having elements 226, 227 and 229 connecting the solenoid with a source of electricity 228. This circuit 215 may be controlled by means including conventional switch parts 223 and 225 diagrammatically shown in Figure 9. The switch means for controlling solenoid 214 may be operated by means such as is described in our parent application or, as is obvious, by manual operation. It can be readily seen by those skilled in the art that the circuit of the solenoid 214 may be extended any desirable distance, such as, for example, from the apparatus to the above mentioned lecturer on a platform distant from the apparatus.

If desired, the tension arm 88 may cooperate with the circuit 307', in Figure 8, which circuit may include electrically operable means the work condition of which it is desired to change when the tension on the film becomes excessive. For example, the circuit 307' may include a relay N which may control the solenoid 214 or the motor which drives the apparatus in cases where cessation of motor operation under predetermined film tension was desirable. To make use of arm 88 in connection with the circuit 307', as described above, the arm may be disposed in its uppermost position to rest against a contact of the circuit 307', which contact will preferably be yieldingly mounted.

Under certain conditions of operation, it may be desirable intermittently to actuate the film at a slower speed than that possible with the motor M, to obtain in effect the projection of a succession of pictures as still or stereopticon pictures. This may be accomplished by the provision of a supplemental driving means for the shutter shaft, and illustrated more particularly in Figure 4. This auxiliary driving mechanism comprises a shaft 320 mounted in bearings on the back of the frame F. At its lower end this shaft carries a bevel gear 322 adapted to mesh with a similar gear on the shutter shaft 56. Normally, these gears are maintained out of engagement by means of a compression spring effective for moving the shaft 320 upwardly. At its upper end this shaft carries a knurled actuating nut or knob 321 which may be grasped at will by an operator, thereby enabling him to bring the gear 322 and the gear on the shutter shaft 56 into engagement for the slow rotation of the shutter shaft. At this time it will be understood that the control button will occupy a position at station S2.

Throughout the foregoing description, reference has been made to projecting apparatus. It will be apparent, however, that many portions of the apparatus are inherently capable of use for regular photographic purposes in the taking of pictures.

Certain of the advantages of the present invention have been pointed out in the foregoing portions of this specification and will be clear from the subjoined claims.

Other advantages arise from the provision of mechanism under the control of the tension of the film for opening and closing the gate, operating the guiding members associated with the gate, and operating the stripping and protecting member, such operations being automatically carried out as a part of the automatic control of the apparatus under normal operation and also as emergency measures in connection with improper feeding or breakage of the film.

We claim:

1. In a film handling apparatus, a film-supporting member and a toothed film-feeding member between which a film is fed, means operable for rendering the teeth of said feeding member inaccessible by the film, and means responsive to changes in the tension of that portion of the film between said supporting member and said feeding member as it is fed therebetween said members for operating said means for rendering the teeth of said feeding member inaccessible by the film.

2. In a film handling apparatus, a film-supporting member and a toothed film-feeding member between which a film is fed, means operable for bodily removing the film from the teeth of said feeding member, and means engaging that portion of the film between said supporting member and said feeding member and responsive to changes in the tension of the film caused by resistance to the movement thereof for operating said removing means.

3. In a film handling apparatus, a film-supporting member, a toothed film-feeding member for feeding a film in relation to said film-supporting member, means operable for rendering the teeth of said film-feeding member inaccessible by the film, electric control means for operating said means, a normally open electrical circuit which when closed operates said control means, and means responsive to changes in the tension of the film being fed between said film-supporting member and said film-feeding member for closing said circuit.

4. In a film handling apparatus, a first means for moving a film, a second and toothed means for moving the film, means for separating the film and the teeth of said second film moving means thereby rendering said second film moving means inoperative to move the film while it is being moved by said first moving means, and means controlled by change in the tension of the film while it is being moved by said first moving means for rendering said separating means ineffective thereby rendering said second moving means operative to move the film.

5. In a film handling apparatus having means for normally feeding a film and means for subjecting the film during such normal feeding operation to the tension required by such normal feeding operation, in combination with a supporting member, a toothed feeding member for feeding the film in relation to said supporting member, protective means for rendering the teeth of said feeding member inaccessible by the film, and means for operating said protective means, said operating means including a prime mover and an actuating member therefor placed adjacent a section of the film between said toothed member and said supporting member and so disposed in relation to the film that it does not increase said tension and is operable by the film upon an increase in tension thereof due to resistance to the movement thereof for actuating said prime mover, whereby excess tension of the film operates said protective means without having itself subjected the film to undue tension during the normal feeding operation.

6. In a film handling apparatus, having embodied therein film-contacting surfaces whereby a film may normally move in an arcuate path of travel, the combination of a film supporting member, a toothed feeding member, said members being so disposed that said feeding member moves the film in relation to said supporting member along said arcuate path, a movable control member disposed between the arc of said normal path and the chord thereof and engageable and movable by the film upon the displacement thereof from said normal arcuate path toward the chord thereof, protective means for rendering the teeth of said feeding member inaccessible by the film, means for moving said protective means to protective position, and a connection between said moving means and said control member for operating said moving means upon the movement of said control member whereby upon the displacement of the film from said normal path said protective means is operated.

7. In a film handling apparatus, having embodied therein film contacting surfaces whereby a film may normally move in an arcuate path of travel, the combination of a film-supporting member, a toothed feeding member, said members being so disposed that said feeding member moves the film in relation to said supporting member along said arcuate path, a movable control member disposed between the arc of said normal path and the chord thereof and engageable and movable by the film upon the displacement thereof from said normal arcuate path toward the chord thereof, protective means for rendering the teeth of said feeding member inaccessible by the film, means for moving said protective means from protective position so that the film is engageable by the teeth of said feeding member, means for feeding the film past said feeding member while said protective means is in protective position, and a connection between said moving means and said control member for operating said moving means upon the movement of said control member whereby upon the displacement of the film from said normal path said protective means is moved from operative position.

8. In a film handling apparatus, a film supporting member and a toothed feeding member between which a film is fed, a first source of power for operating said toothed feeding member, protective means operable for rendering the teeth of said feeding member inaccessible by the film, a second source of power for operating said protective means, control means for applying said second source of power to operate said protective means, means other than said feeding member for feeding the film while said protective means is disposed in protective position, and means responsive to changes in the tension of the film as it is fed by said last mentioned feeding means for actuating said control means.

9. In a film handling apparatus, a film supporting member and a toothed film feeding member between which a film is fed, protective means movable between one position wherein the teeth of said feeding member are accessible by the film and another position wherein said teeth are inaccessible, means for moving said protective means between said positions, an armature, connections between said moving means and said armature for operating said moving means upon the actuation of said armature, a coil for actuating said armature, a normally open circuit for said coil, and means responsive to changes in the tension of the film for closing said circuit.

10. In a film handling apparatus, a film-supporting member, a gate, a toothed member for feeding a film from said supporting member through said gate, said gate including a fixed member, a member for pressing the film against said fixed member and thereby subjecting it to normal tension, and a stripper member operatively connected with said presser member and associated with said feeding member for removing the film from teeth of said feeding member upon the movement of said presser member away from said fixed gate member, control means operable for moving said presser member away from said fixed member and hence operating said film removing member, and a member engaging the film between said gate and said supporting member and responsive to the increase in tension of the film for actuating said control means when there is an excess of tension upon said film between said film supporting member and said gate whereby the film is freed from tension and removed from engagement with the teeth of said feeding member.

11. In a film handling apparatus having means for normally feeding a film and means for subjecting the film during such normal feeding operation to the tension required by such normal feeding operation, in combination, a supporting member, an openable gate, said gate including a fixed section and a section movable relatively thereto, a toothed member for feeding the film through said gate and in relation to said supporting member, protective means operable for rendering the teeth of said feeding means alternatively inaccessible and accessible by the film, operating means for said protective means, means for moving said movable gate section, a prime mover, means for applying the power of said prime mover to said operating means and said gate moving means for operating both of the same, and an actuating member for said power applying means placed adjacent a section of the film between said gate and said supporting member and so disposed in relation to the film that it does not increase said tension and operable by the film upon an increase in tension thereof due to resistance to the movement thereof, whereby excess tension upon the film operates said protective means and said gate without having itself subjected the film to undue tension during the normal feeding operation.

12. In a film handling apparatus having means for normally feeding a film and means for subjecting the film during such normal feeding operation to the tension required by such normal feeding operation, in combination with a supporting member, an openable gate, said gate including a fixed section and a section movable relatively thereto, means for feeding the film through said gate and in relation to said supporting member, means for moving said movable gate section, a prime mover, means for applying the power of said prime mover to said gate moving means for operating said gate moving means, and an actuating member for said power applying means placed adjacent a section of the film between said gate and said supporting member and so disposed in relation to the film that it does not increase said tension and operable by the film upon an increase in tension thereof due to resistance to the movement thereof, whereby excess tension upon the film operates said gate without having itself subjected the film to undue tension during the normal feeding operation.

13. In a film handling apparatus, a film supporting member, an openable gate through which the film travels, said gate including a fixed section and a section movable from a first position wherein said movable section is disposed in cooperative relation with said fixed section and presses the film thereagainst and a second position wherein said movable section is disposed relatively distantly to said fixed section so that the film can be initially threaded therebetween or removed therefrom, means for positively maintaining said movable section in said first position, control means for rendering said maintaining means ineffective and moving said movable section from said first to said second position, means for feeding the film between said supporting member and said gate and between said sections thereof, and operating means for said control means, said operating means including a movable actuating member disposed adjacent the section of the film between said gate and said supporting member and operable by the film upon a change in the tension thereof as it is being fed by said feeding member, and connections between said actuating member and said control means for operating said control means upon the operation of said actuating member by the film.

14. In a film handling apparatus, a film supporting member, an openable gate through which the film travels, said gate including a fixed section and a section movable from a first position wherein said movable section is disposed in cooperative relation with said fixed section and presses the film thereagainst and a second position wherein said movable section is disposed relatively distantly to said fixed section so that the film can be initially threaded therebetween or removed therefrom, means for positively maintaining said movable section in said second position, and control means for rendering said maintaining means ineffective and moving said movable section from said second to said first position, means for feeding the film between said supporting member and said gate and between said sections thereof, and operating means for said control means, said operating means including a movable actuating member disposed adjacent the section of the film between said gate and said supporting member and operable by the film upon a change in the tension thereof as it is fed by said feeding member, and connections between said actuating member and said control means for operating said control means upon the operation of said actuating member by the film.

15. In a film handling apparatus, a film-supporting member, a gate, means for feeding a film between said film-supporting member and said gate, electrically operated means for opening said gate, a normally open circuit for controlling said operating means upon the closing thereof, and means responsive to an increase in the tension of the film caused by resistance to movement thereof and operated by an excess of tension in said film for closing said circuit and operating said gate opening means.

16. In a film handling apparatus, a plurality of supporting members, means for feeding a film therebetween, a sectional gate disposed between said members through which the film travels, electrical control means for moving one of the sections of said gate relatively to another thereof, a normally open electrical circuit the closing of which operates said electrical control means, and means responsive to changes in the tension of the film as it travels between said members for closing said circuit.

17. In a film handling apparatus, an openable gate, said gate including a fixed section and a section movable relatively thereto, means for feeding a film through said gate, and means operable for opening said gate when the tension of the film becomes excessive, said gate opening means including a movable film-engaging actuating member so positioned as to be operatively moved by an increase in the tension of the film caused by resistance to the movement thereof, a source of power other than that created by film tension, control means operated by said source of power for moving said movable section away from said fixed section, and a connection between said actuating member and said control means effective to apply said source of power to move said movable section upon the movement of said actuating member.

18. In a film handling apparatus, a supporting member and an openable gate so disposed upon said apparatus that a film extends therebetween in a curved work path, means for opening said gate, means for feeding the film between said supporting member and said gate through such work path, a film-engaging member disposed within the curve of such work path and the chord thereof and movable upon an increase in the tension of the film resulting from resistance to the movement thereof for moving the film out of such curved work path, and an actuating connection between said film-engaging member and said gate opening means for operating said gate opening means upon such movement of said film engaging member whereby said gate is opened.

19. In a film handling apparatus, a supporting member and a sectional gate between which a film extends in a curved work path, means for feeding the film between said supporting member and said gate, means for moving one of the sections of said gate relatively to another, control means for said moving means including a normally open electric circuit the closing of which operates said control means, and a movable film-engaging member disposed within the curve of such work path and effective for closing said circuit upon the movement of said film-engaging member away from said work path following the movement of the film out of its work path in such curved line toward the chord thereof.

20. In a film handling apparatus having a film-supporting member, an openable gate through which the film may be fed, said film passing to said gate from said member along an indirect work path in the form of a bight, means for opening said gate, a control member engageable with the film in the bight between said supporting member and said gate and movable when the film becomes taut, and operating mechanism operatively interconnecting said gate opening means and said control member for operating said gate opening means upon the movement of said control member when the film becomes taut.

21. In a film handling apparatus, the combination of spaced film supporting members between which a film may be disposed in the form of a bight, an openable gate, means for feeding said film through said gate while it is substantially closed, means for maintaining said gate in closed position, means for opening said gate, a control member engageable with the film in said bight and movable when the film becomes taut, and operating mechanism operatively interconnecting said control member and said gate opening means for operating said gate opening means upon the movement of said control member when the film becomes taut.

22. In a film handling apparatus, the combination of spaced film supporting members between which a film may be disposed in the form of a bight and an openable gate, means for moving said film through said gate while it is open, means for maintaining said gate in open position, means for closing said gate, a control member engageable with the film in said bight and movable when the film becomes taut, and operating mechanism operatively interconnecting said control member and said gate closing means for operating said gate closing means upon the movement of said control member when the film becomes taut.

23. In a film handling apparatus, a member for supporting a film, an openable gate, said gate including a fixed section and a section movable relatively thereto, means for feeding a film from said supporting member and through said gate between the sections thereof, means for moving said movable section between a position wherein it is disposed adjacent said fixed section wherein it presses the film thereagainst and a position relatively distant therefrom, an armature, connections between said moving means and said armature for operating said moving means upon the actuation of said armature, a coil for actuating said armature, a normally open circuit for said coil, and means responsive to changes in the tension of the film caused by resistance to the movement thereof for closing said circuit.

24. In a film handling apparatus, a film-supporting member, a toothed member for feeding a film in relation thereto, a presser member movable to and from operative relation with said toothed member for pressing the film thereagainst, means for moving said presser member away from said feeding member, thereby releasing the film therefrom, and control means responsive to an increase of the tension of the film, caused by resistance to the movement thereof, as it is being fed by said feeding member, for operating said moving means.

25. In a film handling apparatus, a film-supporting member, a toothed member for feeding a film in relation thereto, a presser member movable to and from operative relation with said toothed member for pressing the film thereagainst, electric control means for moving said presser member away from said feeding member, a normally open electric circuit the closing of which operates said control means, thereby releasing the film therefrom, and means responsive to changes in the tension of the film as fed by said feeding means for controlling said circuit.

26. In a film handling apparatus, a member for feeding a film, means operable for bringing the film into operative relation with said feeding member, means other than said member for moving the film, and means responsive to changes in the tension of the film as moved by said other moving means for actuating said means for bringing the film into operative relation with said feeding member.

27. In a film handling apparatus, a member for feeding a film electric means for bringing the film into operative relation with said feeding member, a normally open electrical circuit the closing of which operates said electric means, means other than said member for moving the film, and means responsive to the tension of the film as moved by said other moving means for closing said circuit and thereby operating said means for bringing the film into relation with said feeding member.

28. In a film handling apparatus having means for normally feeding a film and means for subjecting the film during such normal feeding operation to the tension required by such normal feeding operation, in combination, a supporting member, a toothed feeding member for feeding the film in relation to said supporting member, a member movable from and to a position wherein it presses the film against the teeth of said member for operative engagement thereby, operating means for moving said presser member from said position, said operating means including a prime mover and an actuating member therefor placed adjacent a section of the film between said toothed member and said supporting member and so disposed in relation to the film that it does not increase said tension and operable by the film upon an increase in tension thereof due to resistance to the movement thereof for actuating said prime mover, whereby excess tension of the film operates said presser means for withdrawing said means from pressing position without having itself subjected the film to undue tension during the normal feeding operation.

29. In a film handling apparatus having means for normally feeding a film and means for subjecting the film during such normal feeding operation to the tension required by such normal feeding operation, in combination, a supporting member, a toothed feeding member for feeding the film in relation to said supporting member, means other than said feeding member for moving the film, a member movable from and to a position wherein it presses the film against the teeth of said feeding member for operative engagement thereby, operating means for moving said presser member to said position, said operating means including a prime mover and an actuating member therefor placed adjacent a section of the film between said toothed member and said supporting member and so disposed in relation to the film that it does not increase said tension and operable by the film upon an increase in tension thereof due to resistance to the movement thereof for actuating said prime mover, whereby excess tension of the film operates said presser means for moving said means to pressing position without having itself subjected the film to undue tension during the normal feeding operation.

30. In a film handling apparatus, an openable gate through which a film may be fed in a normal projection operation, said gate comprising a fixed section and a section movable relatively thereto, a guiding member movable in respect to said gate sections and movable to a position adjacent one end of said gate for directing the film in respect thereto, control means interconnecting said guiding member and said movable gate section for moving said movable gate section away from said fixed gate section and for moving said guiding member into guiding relation with said gate for the purpose of expediting the threading of the film in respect thereto, in preparation for a subsequential normal projection operation, means for moving the film between said movable gate section and said fixed gate section prior to such projection operation, and means responsive to the changes in the tension of the film for operating said control means whereby said movable gate section is moved away from said fixed gate section and said guiding member is moved into guiding position in preparation for such subsequent projection operation.

31. In a film handling apparatus, an openable gate through which a film extends, said gate comprising a fixed section and a section movable relatively thereto from a first position relatively distant to said fixed section wherein it guides the film in the initial positioning thereof in said apparatus to a second position wherein it is disposed in cooperative and adjacent relation to said fixed section for establishing a portion of the channel through which the film is fed for projection purposes, a guiding member movable from a first position adjacent one end of said gate for directing the film in respect thereto during such initial positioning thereof to a second position wherein it is disposed relatively distantly from said gate, control means interconnecting said guiding member and said movable gate section for moving said guiding member and said movable gate section from said first to said second position for the purpose of expediting the regular projecting operation, means for feeding the film between said movable gate section and said fixed gate section while said movable section and said guiding member are disposed in said first position preparatory to the regular projection operation, electric means for operating said control means, a normally open electric circuit the closing of which operates said control means and means responsive to changes in the tension of the film as fed by said feeding means for closing said circuit whereby said movable section and said guiding member are moved to said second position.

32. In a film handling apparatus, a gate, means for feeding a film therethrough, guiding members movable relatively to said gate and movable to positions adjacent each end of said gate wherein they form a guiding surface cooperating with that of said gate for directing the film in respect thereto, common operating means for moving said guiding members to said positions, and means responsive to changes in the tension of the film for actuating said operating means.

33. In a film handling apparatus, two film supporting members, a fixed apertured member disposed therebetween, a plurality of film guiding members each movable relatively to said apertured member and to each other between a first or threading position wherein they cooperate with each other and with said apertured member to define the path in which the film is threaded and a second or feeding position wherein they cooperate with said apertured member and each other to define the path through which the film is normally fed, control mechanism operatingly interconnecting all of said movable members for moving said members between said first and second position, means for moving the film between said supporting members through said threading path prior to said normal feeding operation, and means responsive to changes in the tension of the film as it is being moved by said moving means for operating said control mechanism whereby said movable members are moved from said first to said second position in preparation for the subsequent feeding operation.

34. In a film handling apparatus, two film supporting members, a fixed apertured member disposed therebetween, a plurality of film guiding members each movable relatively to said apertured member and to each other between a first or threading position wherein they cooperate with each other and with said apertured member to define the path in which the film is threaded and a second or feeding position wherein they cooperate with said apertured member and each other to define the path through which the film is normally fed, control mechanism operatingly interconnecting all of said movable members for moving said members between said first and second positions, means for moving the film between said supporting members through said threading path prior to said normal feeding operation, a prime mover for operating said control mechanism, and means responsive to changes in the tension of the film as it is being moved by said moving means for applying the power of said prime mover to said control mechanism for operating said control mechanism whereby said movable members are moved from said first to said second position in preparation for the subsequent feeding operation.

35. In a film handling apparatus having spaced film supporting means and means for feeding a film between said supporting means, an openable gate, disposed between said supporting means, through which the film is normally fed, said gate including a fixed section and a section movable relatively thereto, a guiding member movable relatively to said supporting means and both of said gate sections and disposed between said gate and one of said supporting means and having a film contacting and guiding surface and movable from and to a position wherein said guiding surface cooperates with one of said sections of said gate while said sections are in relatively remote relation to each other for forming a portion of one side of a path between said gate and said supporting member in which the film is threaded, means for moving the film through said path prior to the normal feeding operation, control means for moving said film engaging member, and means controlled by changes in tension of the film caused by resistance to operative movement thereof as it is being moved by said moving means for actuating said control means.

36. In a film handling apparatus having spaced film supporting means and means for feeding a film between said supporting means, an openable gate, disposed between said supporting means, through which the film is normally fed, said gate including a fixed section and a section movable relatively thereto, a guiding member movable relatively to said supporting means and both of said gate sections and disposed between said gate and one of said supporting means and having a film contacting and guiding surface and movable from and to a position wherein said guiding surface cooperates with one of said sections of said gate while said sections are in relatively remote relation to each other for forming a portion of one side of a path between said gate and said supporting member in which the film is threaded, means for moving the film through said path prior to the normal feeding operation, a prime mover for moving said film engaging member, and means responsive to changes in the tension of the film as it is being moved by said moving means for actuating said prime mover.

37. In a film handling apparatus having spaced film supporting means and means for feeding a film between said supporting means, an openable gate, disposed between said supporting means, through which the film is normally fed ,said gate including a fixed section and a section movable relatively thereto, a guiding member movable relatively to said supporting means and both of said gate sections and disposed between said gate and one of said supporting means and having a film contacting and guiding surface and movable from and to a position wherein said guiding surface cooperates with one of said sections of said gate while said sections are in relatively remote relation to each other for forming a portion of one side of a path between said gate and said supporting member in which the film is threaded, means for moving the film through said path prior to the normal feeding operation, an armature, a connection between said armature and said member for moving said member upon the operation of said armature, a coil for operating said armature, a normally open circuit which when closed operates said coil, and means responsive to changes in the tension of the film as it is moved by said moving means for closing said circuit.

38. In a film handling apparatus, a gate comprising a fixed section and a section movable in respect thereto, a guiding member movable to and from a position adjacent one end of one of said members for guiding a film in respect to said gate, a guiding member movable to and from a similar position adjacent the other end of said gate, operating mechanism interconnecting said guiding members and said movable section of said gate for moving said movable section away from said fixed section and moving said guiding members into cooperative and adjacent position relative to said gate and alternatively moving said movable section into cooperative relation with said fixed section and said guiding means away from adjacent relation to said gate, means for feeding a film through said gate, and means responsive to changes in the tension of the film as so fed for operating said control means.

39. In a film handling apparatus, an openable gate, said gate including a fixed section and a movable section, said movable section being movable to a first position distant to said fixed section and a second position adjacent said fixed section, a first electric prime mover for moving said movable section to said first position away from said fixed section, a second electric prime mover for moving said movable gate section to said second position adjacent said fixed gate section, and means controlled by changes in the tension of the film for alternatively actuating said prime movers.

40. In a film handling apparatus, a member for feeding a film through said apparatus, means for rendering said feeding means inaccessible by said film, and means actuated by an increase in the tension of the film caused by resistance to the operative movement thereof for operating said first named means.

WARREN DUNHAM FOSTER.
EARLE L. PARMELEE.